United States Patent [19]
Young

[11] 3,887,221
[45] June 3, 1975

[54] JOINT COUPLING
[75] Inventor: Niels O. Young, Mason, N.H.
[73] Assignee: Block Engineering, Inc., Cambridge, Mass.
[22] Filed: June 15, 1973
[21] Appl. No.: 370,355

[52] U.S. Cl............................ 285/236; 285/DIG. 12
[51] Int. Cl............................................. F16l 17/00
[58] Field of Search........ 285/DIG. 12, DIG. 6, 234, 285/233, 236, 369, 398, 27, 24, 242

[56] References Cited
UNITED STATES PATENTS

| | | | |
|---|---|---|---|
| 2,998,269 | 8/1961 | Houghton | 285/236 |
| 3,084,959 | 4/1963 | Stanton | 285/DIG. 12 |
| 3,233,907 | 2/1966 | Stanton | 285/DIG. 12 |
| 3,612,584 | 10/1971 | Taylor | 285/DIG. 6 |
| 3,718,351 | 2/1973 | Bakkerus | 285/236 |

*Primary Examiner*—Patrick D. Lawson
*Attorney, Agent, or Firm*—Schiller & Pandiscio

[57] ABSTRACT

Two pieces of tubing are coupled by cooperation of two sleeves. In one embodiment of the invention the tubing is relatively substantially rigid, a relatively distortable connecting sleeve is disposed around the tubing at the juncture, and a relatively substantially rigid locking sleeve having an inside taper is slipped over the relatively distortable sleeve. In a second embodiment the tubing is relatively distortable, a relatively substantially rigid connecting sleeve is disposed within the tubing at the juncture and a relatively substantially rigid locking sleeve having an inside taper is slipped over the tubing at the junction.

In both embodiments the locking sleeve is dimensioned so that its inside taper squeezes the tubing pieces and the connecting sleeve together.

18 Claims, 7 Drawing Figures

3,887,221

3,887,221

JOINT COUPLING

This invention relates to novel couplings, and more particularly to systems for coupling the abutting ends of two pieces of tubing.

Various systems for coupling abutting ends of tubing are known in the art. Typical prior art coupling systems, such as sleeve and clamps, ground joint fittings and ball joint fittings have a number of disadvantages.

Sleeve and clamp systems are somewhat cumbersome and may be time consuming to use. Also, if the clamps are not sufficiently tightened the couple may leak, while excess tightening may fracture the tubing or the sleeve.

Manufacture of ground joint and ball joint fittings is costly. Additionally, such fittings may have a tendency to "freeze" and subsequent separation may be difficult. Furthermore, ground joints normally require the use of a grease to insure seal integrity, which may contaminate fluid being carried through the union.

While this latter disadvantage may be overcome in ball joints by the use of washers, ball joints have the disadvantage of requiring somewhat cumbersome hardware which may cover the union so that visual inspection of the joint to ascertain seal integrity may not be possible.

A principal object of the present invention is, therefore, to provide a novel system for coupling the abutting ends of pieces of tubing. Other objects of the present invention are to provide such a system which is simple in construction and relatively inexpensive to manufacture; to provide such a system which is easy to use, which requires no grease or the like for sealing; and to provide a system of the type described which allows visual inspection of the joint.

Other objects of the present invention will, in part, be obvious and will, in part, appear hereinafter.

These and other objects of the present invention are achieved by coupling two pieces of tubing by cooperation of a connecting sleeve which bridges the juncture of the two pieces of tubing, and a locking sleeve which locks the tubing and the connecting sleeve together, and seals the coupling. In a first embodiment of the invention, particularly useful where the tubing being coupled is relatively substantially rigid, a relatively distortable connecting sleeve is disposed around the ends of the two pieces of tubing at the juncture, and a relatively substantially rigid locking sleeve having an inside taper is slipped over the connecting sleeve. In a second embodiment particularly useful where the tubing is relatively distortable, a relatively substantially rigid connecting sleeve is positioned within the ends of the two pieces of tubing at the juncture, and a relatively substantially rigid locking sleeve having an inside taper is slipped over the two pieces of tubing at the juncture. In both embodiments of the invention the locking sleeve is dimensioned so that its inside taper distorts the distortable member and squeezes the tubing pieces and the connecting sleeve together.

As used herein the terms "substantially rigid" and "substantially distortable" are used in their relative meanings — i.e., relative to each other.

The invention accordingly comprises the apparatus possessing the construction, combination of elements and arrangement of parts, and the method including the several steps and the relationship thereof, all of which are exemplified in the following detailed disclosure, and the scope of application of which will be indicated in the claims.

For a fuller understanding of the nature and objects of the invention, reference should be made to the following detailed description taken in connection with the accompanying drawings wherein.

Figure 1:
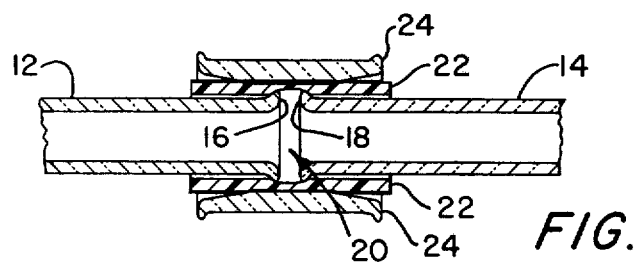
FIG. 1 is a cross-sectional view of an embodiment of coupling of the present invention.

Reference is now made to FIG. 1 of the drawings wherein there is illustrated a form of a coupling particularly useful with relatively substantially rigid tubing. The coupling comprises a pair of elongate tubes 12 and 14 of substantially the same average outside diameters. It is preferred that ends 16 and 18 respectively of tubes 12 and 14 be flared outwardly as shown in FIG. 1. Preferably tubes 12 and 14 are formed of relatively substantially rigid materials such as glass, synthetic polymers or the like which are at least partially transparent to the visible spectrum.

Tubes 12 and 14 are positioned so that ends 16 and 18 are substantially coaxially aligned, and adjacent or abutting each other at a junction 20.

Surrounding tubes 12 and 14 at junction 20 and extending to either side of the junction for a distance is a unitary connecting sleeve 22. Sleeve 22 is a short cylinder composed of a relatively distortable material which may either be elastically deformable, i.e., resilient, or plastically deformable, i.e., non-resilient. Theoretically all materials are both elastically and plastically deformable to some extent. For the purposes of this application a material will be considered as "elastically" deformable to the extent that the material can return to its original configuration following release of a distorting face or restraint. Among preferred relatively distortable materials for sleeve 22 may be mentioned natural polymeric materials, e.g. rubber, and synthetic polymeric materials such as polymers and co-polymers of ethylene, styrene and the like. Especially preferred for sleeve material are the polytetrafluorethylene materials available under the trademark "Teflon" from the E. I. DuPont de Nemours and Co., Inc. Sleeves made of Teflon material have the advantages of being substantially inert to many materials, and are self lubricating. This latter advantage will become apparent from the description following.

The interior of sleeve 22 is dimensioned so as to fit somewhat snugly over ends 16 and 18 of tubes 12 and 14, i.e., with some distortion, but also so that sleeve 22 can be relatively easily forced over ends 16 and 18.

Typically, sleeve 22 is a relatively short cylinder having an inside diameter which is slightly greater than the average outside diameter of tubes 12 and 14 and slightly smaller than the outside diameter of tubes 12 and 14 at adjacent ends 16 and 18, i.e., at the widest point on the flare.

There is also provided a locking sleeve 24 in the form of a relatively short cylinder composed of a relatively substantially rigid material, preferably such as 7740 glass or Pyrex glass or a transparent, substantially rigid synthetic polymeric material such as clear alpha-buta styrene (ABS), polystyrene and the like.

Sleeve 24 is long enough to bridge the junction between tubes 12 and 14 and extend beyond the junction on either side for a short distance. As seen in FIG. 1 sleeve 24 is slightly shorter than sleeve 22, although it should be understood that sleeves 22 and 24 can have substantially identical lengths, or one of sleeves 22 and 24 may be longer than the other.

Figure 6:
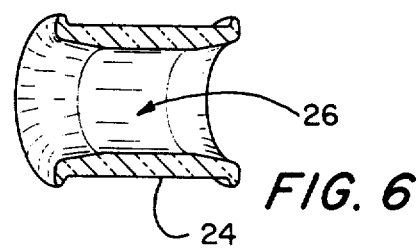
FIG. 6 is an enlarged perspective view in cross-section of a preferred embodiment of locking sleeve used in the coupling of the present invention shown in FIGS. 1, 2 and 3.

As seen in FIG. 6, sleeve 24 is tapered inwardly for a distance along its inside surface 26 to a minimum inside diameter, preferably at about the middle of the sleeve. Sleeve 24 is dimensioned so as to fit somewhat snugly over sleeve 22 and to distort or compress sleeve 22 when the latter is disposed over ends 16 and 18, but also so that sleeve 24 can be relatively easily forced over sleeve 22. This distortion or compression of the latter seals the coupling.

To assemble the embodiment of the invention shown in FIG. 1, locking sleeve 24 is first placed on one tube and moved away from the end. The relatively distortable connecting sleeve 22 is then forced partially over the end of one of the tubes, and the other tube is then forced into the sleeve. The tubes are then axially forced together so that their ends abut or are adjacent to each other. Preferably the junction of the two tubes is centered in sleeve 22. Locking sleeve 24 is then slid over the relatively distortable sleeve 22 and preferably centered over the junction. With proper choice of dimensions for the sleeves, the inside taper 26 of sleeve 24 squeezes distortable sleeve 22 against the tubes as shown in FIG. 1, compressibly sealing the coupling. If desired, a small amount of lubricant may be used to assist assembly when sleeve 22 and the tubes have a relatively high degree of frictional engagement as, for example, when sleeve 22 is rubber and the tubes are a metal. With combinations of other materials which have a relatively low degree of frictional engagement, e.g. sleeve 22 is Teflon and the tubes glass, no lubricant may be needed to assist assembly.

Figure 2:
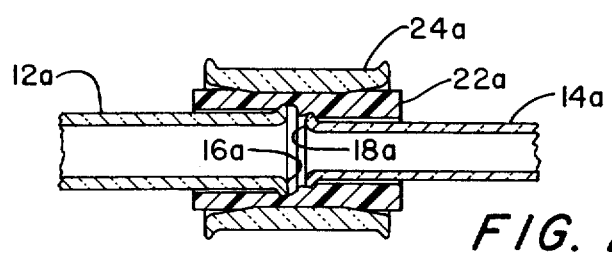
FIG. 2 is a cross-sectional view of another embodiment of coupling of the present invention.
Figure 4:
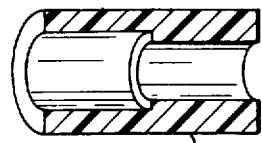
FIG. 4 is a perspective view in cross-section of a preferred embodiment of connecting sleeve (in undistorted state) used in the embodiment of coupling of the present invention shown in FIG. 2.

Another embodiment of coupling of the invention is shown in FIG. 2. This embodiment differs from that shown in FIG. 1 in that the relatively substantially rigid tubes 12a and 14a have different outer diameters adjacent the ends 16a and 18a thereof. The relatively distortable connecting sleeve 22a is a short cylinder having a substantial constant outside diameter along its length, as before. As shown in FIG. 4 sleeve 22a differs from sleeve 22 shown in FIG. 1 in that the inside diameter of sleeve 22a has a stepped inside dimension, so as to fit somewhat snugly over the ends of the tubes, i.e., with some distortion, but also, as with sleeve 22, sleeve 22a is dimensioned so that it can be relatively easily forced over ends 16a and 18a. Sleeve 24a is a relatively short cylinder composed of a relatively substantially rigid material and is tapered inwardly for a distance along its inside surface similar to sleeve 24 described previously. Assembly of the coupling is as described for the embodiment shown in FIG. 1.

Figure 3:
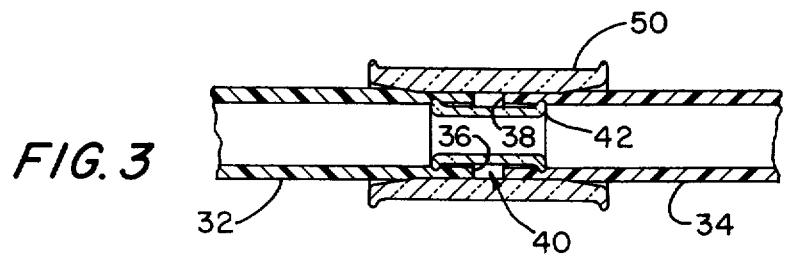
FIG. 3 is a cross-sectional view of still another embodiment of coupling of the present invention.

Still another embodiment of coupling of the invention is shown in FIG. 3 in which two relatively flexible tubes 32 and 34 are coupled. The coupling comprises a pair of elongate tubes 32 and 34 of substantially the same average inside and outside diameters at ends 36 and 38. Tubes 32 and 34 are formed of a relatively substantially flexible material such as a natural polymeric material, e.g. rubber, or a synthetic polymeric material such as polymers and co-polymers of ethylene, styrene and the like. Preferably tubes 32 and 34 are formed of transparent flexible materials.

Tubes 32 and 34 are positioned so that ends 36 and 38 are substantially coaxially aligned, and adjacent or abutting each other at a junction 40.

Figure 5:
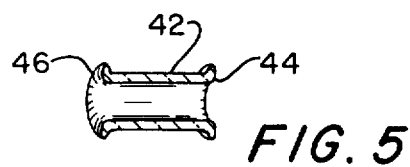
FIG. 5 is a perspective view in cross-section of a preferred embodiment of connecting sleeve used in the embodiment of coupling of the present invention shown in FIG. 3.

Tubes 32 and 34 surround a unitary connecting sleeve 42 at junction 40 and to either side of the junction for a distance. Sleeve 42 is a short cylinder composed of a relatively substantially rigid material, preferably also transparent, such as glass. Preferably also, sleeve 42 has outwardly flared ends 44 and 46, e.g. as shown in FIG. 5.

Sleeve 42 is dimensioned so as to fit somewhat snugly into ends 36 and 38 of tubes 32 and 34, i.e., with slight distortion of the tubes, but also so that sleeve 42 can be relatively easily slipped into ends 36 and 38. Typically sleeve 42 is a relatively short cylinder having a maximum outside diameter, e.g. at flared ends 44 and 46, which is slightly greater than the inside diameter of tubes 32 and 34 at ends 36 and 38, and an average outside diameter which is slightly smaller than the inside diameter of tubes 32 and 34 at ends 36 and 38.

A locking sleeve 50 surrounds tubing 32 and 34 at the junction 40. Sleeve 50 is similar to sleeve 24 described above.

To assemble the embodiment of the invention shown in FIG. 3 locking sleeve 50 is first placed on one tube and moved away from the end. The relatively rigid connecting sleeve 42 is forced into the end of one of the tubes for a part of its length, and a portion of sleeve 42 is left exposed. The other tube is then forced over the exposed portion of sleeve 42, and the tubes are then axially forced together so that their ends abut or are adjacent each other. Preferably the junction 40 is centered on sleeve 42. Locking sleeve 50 is then slid over tubes 32 and 34 and preferably is centered over the junction 40. The inside taper of sleeve 50 squeezes or compresses the relatively distortable tubes against sleeve 42, compressibly sealing the coupling.

The following example illustrates a preferred embodiment of the invention. Two pieces of glass tubing are coupled as follows. Two pieces of 0.236 average outside diameter standard wall glass tube are flared at the ends by heating the ends of the tubes until the glass becomes somewhat soft; the ends of the tubes are then pressed against a flat surface resulting in the tubing being flared outwardly from the ends about 0.020 – 0.040 inch, with a maximum outside diameter of about 0.274 inch.

A short piece of Teflon tubing (available from E. I. DuPont de Nemours and Co., Inc., U.S.A.) having an inside diameter of 0.262 inch, a wall thickness of about 0.031 – 0.032 inch, and length of about three-fourths of an inch is forced over the flared ends of the tubes. The ends of the tubing are then axially forced together so that their ends abut one another. The junction of the tubes then is centered in the Teflon tube. A tapered glass cylinder having a length of about three-fourths of an inch is slid over the Teflon tube and centered over the junction. The tapered cylinder is made of Pyrex having a standard wall thickness. The cylinder is tapered inwardly from its ends towards the center half length of the cylinder to a minimum inside diameter of about 0.329 – 0.330 inch. The tapered cylinder compresses the Teflon tubing against the flared ends of the tubes. A coupling is obtained which when tested on a leak tester will be found to have a vacuum leak rate comparable with Teflon.

As previously noted, the coupling construction of the present invention has an advantage in that it lends itself to especially simple manufacture from inexpensive materials. As will be seen from the foregoing that in addition to the advantages herein enumerated, the coupling requires no grease for sealing purposes which may otherwise contaminate fluids being conveyed in the tubing. Additionally, the sleeves may be made of a transparent or substantially transparent material so that the seal may be inspected visually. Also, the ends of the tubing may be forced to closely abut whereby the seal will have a minimum dead volume. A particular feature of the coupling of the invention is that it is relatively flexible. This feature may be of special advantage where it is used in a system which may be subjected to vibrations as by a stirring mechanism somewhere in the system. The coupling also has a relatively small outer diameter which may be of advantage where space is a factor, and the coupling requires no special tools for either assembling or disassembling.

It will be apparent that the coupling of the present invention has particular utility for use in research and testing laboratories and the like as well as chemical pilot plants and chemical process installations of all types. Additionally, the invention may be used in building construction, e.g. for joining conduit for carrying water, heating fluids, electrical cable and the like. Other applications of the couplings of the invention will be apparent to one skilled in the art.

Figure 7:
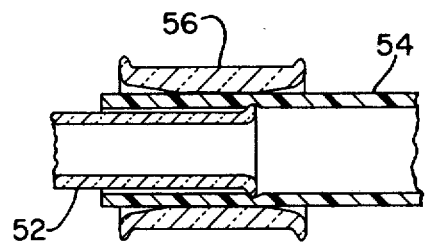
FIG. 7 is a cross-sectional view of still another embodiment of coupling of the present invention.

Still other changes may be made in the above apparatus and process without departing from the scope of the invention herein involved. For example, two pieces of relatively distortable tubing having substantially the same average outside diameters, but different inside diameters may be coupled with a suitably dimensioned relatively substantially rigid connecting sleeve with a stepped outside surface and a relatively rigid tapered locking sleeve of the type previously described. Still another embodiment of coupling of the invention is shown in FIG. 7. The coupling comprises a piece of substantially rigid tubing 52 which coupled to a piece of distortable tubing 54 using the relatively substantially rigid locking sleeve 56 having an inside taper as above described. The piece of substantially rigid tubing 52 should have an outside diameter which is substantially equal to the inside diameter of the piece of relatively distortable tubing 54. An end of the substantially rigid tubing 52 is positioned within an end of the relatively distortable tubing 54, and the relatively substantially rigid locking sleeve 56 having an inside taper is slipped over the two pieces of tubing at the juncture. The locking sleeve 56 is dimensioned so that its inside taper distorts the piece of distortable tubing 54 and squeezes the two pieces together. It is therefore intended that all matter contained in the above description or shown in the accompanying drawings shall be interpreted as illustrative and not in a limiting sense.

I claim:

1. A coupling, comprising in combination:
   a pair of elongate tubes;
   a connecting sleeve; and
   a relatively substantially rigid locking sleeve comprising a one piece, relatively short cylinder having an inside taper:
   one of said pair of elongate tubes or said connecting sleeve being relatively substantially rigid and the other being relatively distortable, said pair and said connecting sleeve being dimensioned so as to be engageable with each other at a junction,
   said locking sleeve surrounding said relatively distortable one at said junction and being dimensioned so that its inside taper distorts said relatively distortable one and squeezes said pair and said connecting sleeve together adjacent said junction.

2. A coupling as defined in claim 1 wherein said tubing comprises a pair of elongate tubes formed of relatively substantially rigid material, and said connecting sleeve comprises a relatively short cylinder formed of relatively deformable material and is disposed around the ends of said tubes at said junction.

3. A coupling as defined in claim 2 wherein said tubing is flared outwardly for a distance adjacent its ends at said junction.

4. A coupling as defined in claim 3 wherein the inside diameter of said connecting sleeve is smaller than the outside diameter of said tubing at said flares.

5. A coupling as defined in claim 2 wherein said relatively deformable material is resilient.

6. A coupling as defined in claim 1 wherein said tubing comprises a pair of elongate tubes formed of relatively deformable material, and said connecting sleeve comprises a relatively short cylinder formed of relatively substantially rigid material and is disposed within the ends of said tubes at said junction.

7. A coupling as defined in claim 6 wherein said connecting sleeve is flared outwardly for a distance adjacent at least one of its ends.

8. A coupling as defined in claim 7 wherein the inside diameter of said tubing adjacent its ends is smaller than the outside diameter of said connecting sleeve at said flares.

9. A coupling as defined in claim 6 wherein said relatively deformable material is elastically deformable.

10. A coupling comprising in combination:
    a pair of relatively substantially rigid tubes aligned end-to-end at a junction;
    a relatively distortable inner sleeve disposed around said pair at said junction; and
    a relatively substantially rigid outer sleeve comprising a one piece, relatively short cylinder having an inside taper disposed around said inner sleeve at said junction and distorting said inner sleeve so as to squeeze said tubes and said inner sleeve together.

11. A coupling as defined in claim 10 wherein said pair have substantially the same cross sections.

12. A coupling as defined in claim 10 wherein said pair are flared outwardly for a distance adjacent said ends.

13. A coupling comprising in combination:

a pair of tubes which are relatively deformable at least at the ends thereof, coaxially aligned end-to-end at a junction;

a relatively substantially rigid inner sleeve interconnecting said pair at said junction; and a relatively substantially rigid outer sleeve having an inside taper disposed around said pair at said junction and distorting said pair so as to squeeze said tubes and said inner sleeve together at said junction.

14. A coupling as defined in claim 13 wherein said pair have substantially the same cross sections.

15. A coupling as defined in claim 13 wherein said inner sleeve is flared outwardly for a distance adjacent at least one of its ends.

16. A coupling, comprising in combination:

a pair of elongate tubes; and a relatively substantially rigid locking sleeve having an inside taper;

one of said pair of elongate tubes being substantially rigid and the other being relatively distortable, said pair being dimensioned so that an end of said relatively distortable tube may be disposed around an end of said substantially rigid tube at a junction;

a relatively substantially rigid outer sleeve having an inside taper disposed around said relatively distortable tube at said junction and distorting said relatively distortable tube so as to squeeze said tubes together.

17. A method of coaxially coupling a pair of relatively substantially rigid elongate tubes end-to-end at a junction comprising:

disposing around said junction a relatively distortable sleeve, and disposing around said relatively distortable sleeve a relatively substantially rigid sleeve comprising a one piece, relatively short cylinder having an inside taper such that said relatively substantially rigid sleeve distorts said relatively distortable sleeve whereby said pair and said relatively distortable sleeve are squeezed together at said junction.

18. A method of coaxially coupling a pair of relatively distortable elongate tubes end-to-end at a junction comprising:

inserting a relatively substantially rigid tube into the ends of said relatively distortable pair at said junction, and disposing around said relatively distortable pair a relatively substantially rigid sleeve having an inside taper such that said relatively substantially rigid sleeve distorts said relatively distortable pair whereby said pair and said tube are squeezed together at said junction.

* * * * *